United States Patent [19]

Cutler et al.

[11] 3,829,860

[45] Aug. 13, 1974

[54] SIGNAL CORRELATOR

[75] Inventors: Thomas P. Cutler, Chestnut Hill, Mass.; Kenneth Dollinger, Nashua, N.H.

[73] Assignee: The United States of America as represented by the Secretary of the Navy, Washington, D.C.

[22] Filed: Jan. 25, 1971

[21] Appl. No.: 109,603

[52] U.S. Cl. .................. 343/9, 235/181, 343/5 DP, 343/17.2 R, 343/100 CL

[51] Int. Cl. .......................... G01s 9/44, G06f 15/34

[58] Field of Search .. 343/100 CL, 5 DP, 9, 17.1 R, 343/17.2 R; 235/181

[56] References Cited

UNITED STATES PATENTS

| | | | |
|---|---|---|---|
| 3,167,738 | 1/1965 | Westerfield | 343/5 DP |
| 3,412,397 | 11/1968 | Evans | 343/100 CL |
| 3,599,209 | 8/1971 | Goodrich | 343/9 |
| 3,681,579 | 8/1972 | Schweitzer | 235/181 |
| 3,725,916 | 4/1973 | Cutler | 343/100 CL |

*Primary Examiner*—Malcolm F. Hubler
*Assistant Examiner*—G. E. Montone
*Attorney, Agent, or Firm*—R. S. Sciascia; Henry Hansen

[57] ABSTRACT

A signal encoded with three superimposed binary codes is divided into a predetermined number of parallel lines equal to the number of bits in the first code and passed to a second code correlator. Each parallel output of the second code correlator is sampled and stored in a corresponding row of a core storage matrix so that each row of the matrix contains a history of the polarity of the corresponding signal. The bits stored on each row represent the third code sequence while the overall polarity of one row relative to the next adjacent row is governed by the first code. One at a time each row of signals is vertically read out in parallel to a long shift register having multiple sections. Each section is masked for output in accordance with the third code. The entire mask on each section is either normal or inverted in accordance with the first code. The shift register output is connected to a summing network which adds the corresponding bits in each section to produce parallel analog outputs. The signal, now correlated for the first, second and third codes, may be further processed for any remaining information such as doppler frequency in the case of a received radar signal.

18 Claims, 7 Drawing Figures

INVENTORS
THOMAS P. CUTLER
KENNETH DOLLINGER

BY [signature]

ATTORNEY

2ND CODE CORRELATOR

INVENTOR.
THOMAS P. CUTLER
KENNETH DOLLINGER
BY
Henry Hansen
ATTORNEY

INVENTOR.
THOMAS P. CUTLER
KENNETH DOLLINGER
BY
Henry Hansen
ATTORNEY

SIGNAL CORRELATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to the field of signal processing and more particularly to correlating encoded signals, especially those used in ranging systems and the like.

Code correlation is frequently used to identify the source of a signal. The technique involves attempting to match the incoming signal with a sample of a known code. Such signals often have been modulated in some manner to carry information in addition to their identifying codes. In order to process the additional information, applications, such as high resolution pulse doppler radar, require that the incoming signals be sampled and stored temporarily prior to frequency analysis. Where the signals comprise a large number of parallel or simultaneous lines or channels representing range increments, for instance, the lines may all be sampled at the same times and stored in a magnetic core storage matrix. One of the problems is such storage systems is discriminating against noise or clutter mixed in with the information on the stored signals. Increasing the sampling rate and number of cores is one way of increasing the maximum clutter that can be handled by the system. However, this method has the disadvantage of a proportionate increase in size and cost of the system. If the signal on each line could be distributed over several adjacent lines, the sampling rate and number of cores would be effectively increased with no additional memory size. This principle is set forth in U.S. Pat. No. 3,422,432 assigned to Sanders Associates, Inc. Where multiple superimposed codes have been impressed on the signals beforehand, such distribution before code correlation requires post storage correlation in both the vertical and horizontal dimensions. Previous techniques for correlating in two dimensions have proved to be inadequate. Two separate steps were required: first vertical and then horizontal correlation. Since the vertical correlation had produced signals of varying voltage, the horizontal correlation had to be performed on analog signals. Analog correlation could not be done digitally and was therefore a complex, expensive technique severly limited in reliability and speed.

SUMMARY OF THE INVENTION

Accordingly, one of the objects of the invention is to perform code correlation simultaneously in two dimensions on an array of stored signals. Another object of the invention is to provide post storage two-dimensional code correlation on a binary or digital basis while preserving the additional analog information carried by the stored signals. A further object of the invention is to digitally correlate for two codes simultaneously after a triply encoded input signal has been precorrelated for one code and stored in a storage matrix. Still another object of the invention is to increase the effective number of cores used in a core storage matrix for doppler signal processing by distributing the input signal over a number of adjacent gated lines without increasing the sampling rate or the actual size of the core matrix.

These and other objects are achieved by distributing the bits of a first code over contiguous horizontal lines, as taught in U.S. Pat. No. 3,422,432, then correlating for a second code and passing the resulting set of parallel range lines to a core storage matrix. The stored signals will be coded horizontally in accordance with a third code, as set forth in U.S. application Ser. No. 665,069, now U.S. Pat. 3,725,916 and assigned to Sanders Associates, Inc., and vertically in accordance with the first code. One at a time the horizontal lines stored in the matrix are fed in parallel to a long shift register having multiple sections. Each section is tapped for output in accordance with the third code, as set forth in U.S. application Ser. No. 723,223, filed Apr. 22, 1968 which application is in condition for allowance and assigned to Sanders Associates, Inc. The polarity of the entire mask within one section in relation to that of the next adjacent section is governed by the first code. The number of sections is at least equal to the number of bits in the first code. The outputs of the multiple sections are passed to a summation network which adds the corresponding bits of each section output. The output of the summation network may then be passed to a doppler stitch network, of the type set forth in U.S. Pat. No. 3,496,544, assigned to Sanders Associates, Inc., or other processing means.

DESCRIPTION OF THE PREFERRED EMBODIMENT

Figure 1:
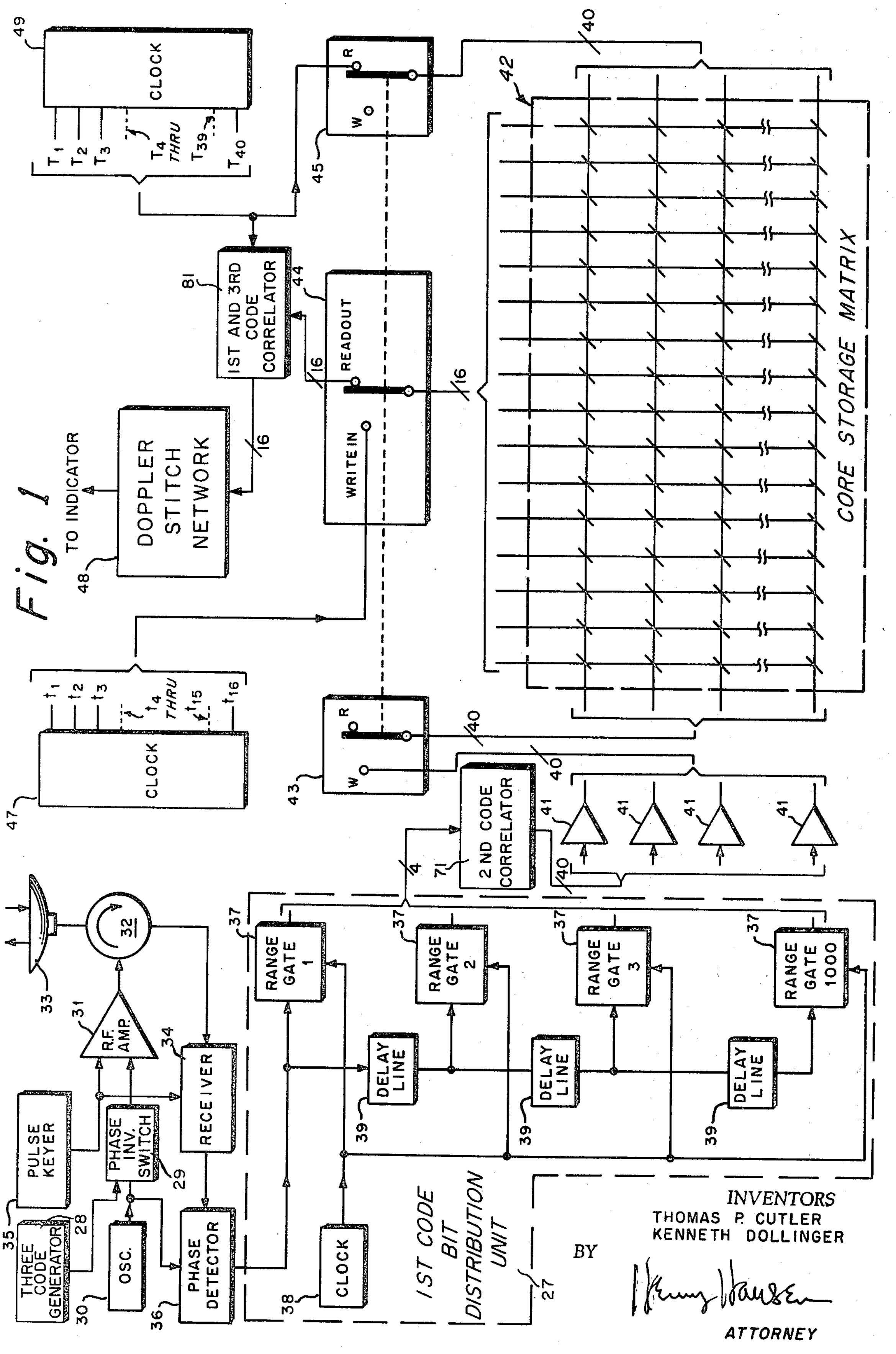
FIG. 1 is a schematic and block diagram of a coded doppler radar system incorporating the two-dimensional signal correlator according to the invention.

The coded pulsed doppler radar is shown in FIG. 1 to illustrate a particular application of the digital correlation system according to the invention. The radar transmitter comprises an oscillator 30 producing a CW RF output which is phase modulated by a phase inverting switch 29. Switch 29 alternates the phase orientation of the output of oscillator 30 between 0° and 180° in accordance with the binary signal produced by a three code generator 28. The three codes generated are superimposed codes of differing bit rate, number, and sequence of bits. For convenient illustration and to facilitate and understanding of the invention, the three superimposed codes are assumed to be as follows: first code, a 4-bit code with a fixed binary sequence ++−+; second code, a 10-bit shift register code each bit of which is formed by a single word in the first code, that is, the 4-bit sequence of the first code is inverted or normal in accordance with the sequence of the second code; and third code, a 16-bit special code similarly composed of inverted or normal 10-bit words of the second code. The phase encoded signal of switch 29 is amplified by a pulsed amplifier 31 and passed via a circulator 32 to an antenna 33. The transmitted output comprises a series of phase coded RF pulses whose width and repetition frequency are determined by pulse keyer 35. Reflected signals are received by antenna 33 and passed to a receiver 34 via circulator 32. Receiver 34 is also connected to keyer 35 so that it can be turned off periodically during actual pulse transmission. The output of receiver 34 is mixed with the output of oscillator 30 in a phase detector 36. Those acquainted with the principles of doppler radar will recognize that the output of phase detector 36 will be sinusoidally varying for moving targets since the phase of the signal reflected by a moving target is constantly changing due to the doppler effect.

The output of phase detector 36 is passed to a first code bit distribution unit 27 comprising a number of range gates 37 equal to the number of bits in the first code, in this instance, four. Each gate 37 is opened simultaneously by a timing pulse from a clock 38. The signal from phase detector 36 passes undelayed to range gate 37 number 1. Cascaded delay lines 39 connected to receive the output of detector 36 provide a series of delayed replicas of the detector output to the remaining range gates. The delay between each two adjacent range gates 37 is equal to the bit rate of the first code. The pulse from clock 38 will occur once for each full cycle of the first code and gates 37 will open long enough to pass one first code bit, thus distributing the first code bits on four parallel lines, represented by respective outputs from range gates 37, numbers 1 through 4.

Figure 4:
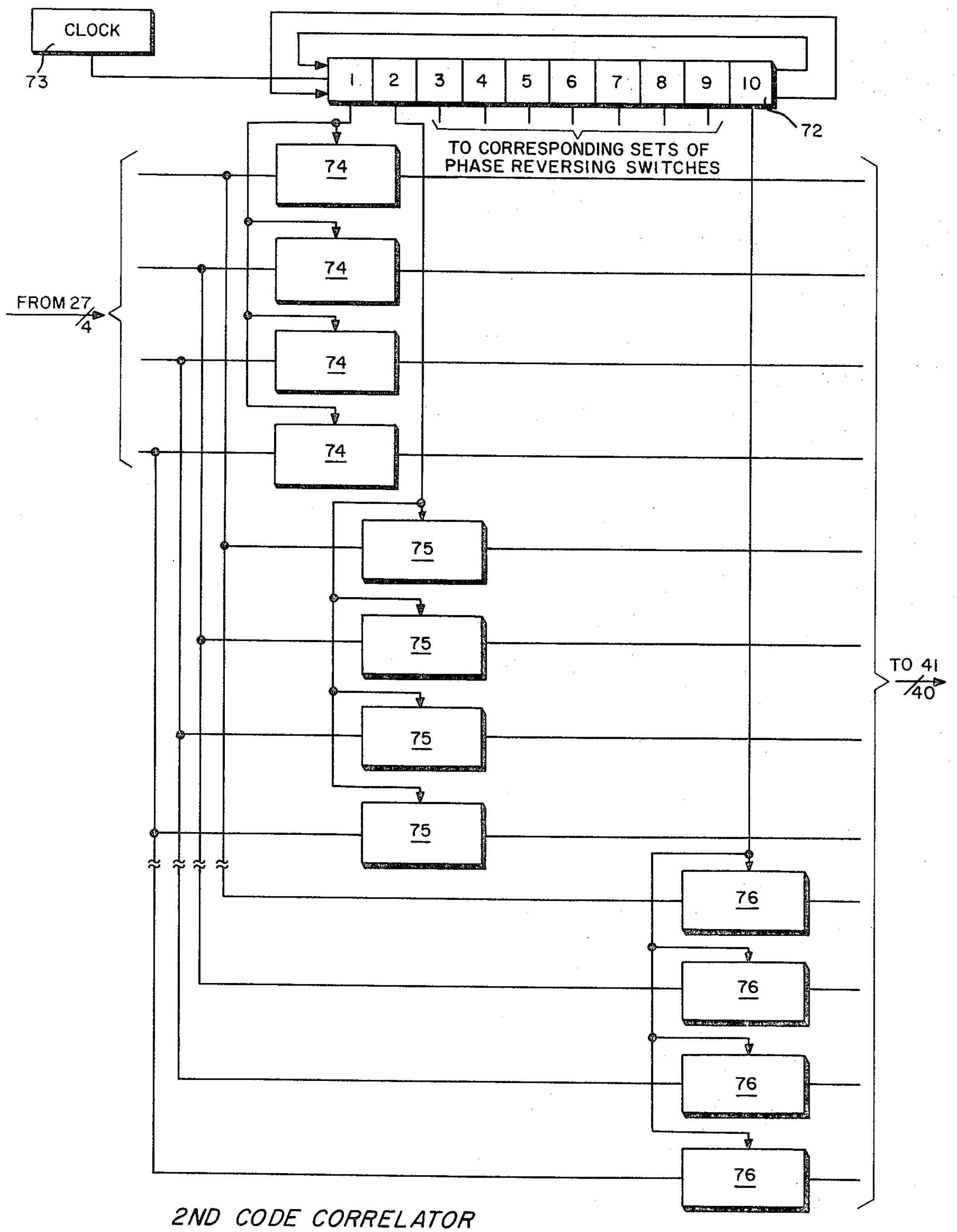
FIG. 4 is a block diagram of an embodiment of the second code correlator of FIG. 1.

The four parallel outputs of distribution unit 27 are then passed to a second code correlator 71. Referring now to FIG. 4, wherein correlator 71 is shown in more detail a 10-bit shift register 72 is shifted at the bit rate of the second code by a clock 73. Each of the ten stages in the register is initially set at the zero or one state in accordance with the known sequence of bits in the second code. As register 72 is shifted to the right by pulses from clock 73 the code is caused to traverse the register since the condition of stage 10 of the register 72 becomes the input to stage 1 by means of a ring-around circuit. Each of the lines from distribution unit 27 is fed to a corresponding one of four phase reversing switches 74. Switch 74 on each line causes the phase of the input signal to be either inverted or left normal in accordance with the condition of the first stage of register 72. It will be understood that over the whole 10-bit period of the second code, the first stage of register 72 runs through the entire code sequence. Switches 74 will therefore positively correlate signals on the four output lines from unit 27 if they also have the same sequence of bits. Stage 2 of shift register 72 similarly controls a second bank of four phase reversing switches 75. The input to each switch 75 is tapped from the corresponding one of the four input lines from unit 27. Each successive stage of shift register 72 serves as a time delay. If the signals entering switches 74 do not correlate but the same signals entering switches 75 do correlate, it indicates that receipt of the signal was delayed which, in turn, corresponds to a range increment. The outputs of the remaining stages through 10 are therefore similarly connected to separate banks of four phase reversing switches, such as switches 76 included for stage 10 of register 72. In each case the input signals to the phase reversing switches are the four output lines from unit 27. Each successive group of four horizontal lines therefore represents range increments while any four contiguous horizontal lines out of the total forty parallel lines of correlator 71 will be coded vertically according to the first code, or the first code shifted one, two or three places to the right depending on which four contiguous lines are being considered.

The second code having been removed by code correlator 71, the information which now remains on the lines includes doppler frequency information, third code distributed over each horizontal line and the first code distributed vertically. Referring to FIG. 1, the 30 line parallel output of code correlator 71 is next passed to respective hard limiter amplifiers 41 which convert the parallel analog inputs to parallel binary outputs which contain positive and negative bits in accordance with the instantaneous polarity of the analog input signals.

An orthogonal magnetic core storage matrix 42 is employed to store gated samples of the 40 input lines and to furnish the samples in parallel one at a time for further processing. Matrix 42, for illustration, comprises an array of 640 conventional binary cores in 16 vertical columns and 40 horizontal rows corresponding to the number of gated lines to be entered. Each of 16 vertical wires passes through a corresponding column of cores. Likewise, 40 horizontal wires pass through each respective row of cores to form a grid. The wires may be wound on each core through which they pass to increase the flux. Using well-known coincident current techniques, any single core may be selected for write in or readout. By passing a current through both the horizontal wire and the vertical wire which pass through a given core, the two fluxes may be made to add and to just exceed the threshold value necessary for switching magnetic polarity of the selected core. Core switching thresholds can be suitably adjusted by varying the size, configuration and composition of the core and the number of turns in the windings of the horizontal and vertical wires used on each core as drive lines.

In matrix 42, the same vertical lines operate as sampling gates for write in and as sense lines for readout depending on the mode selected by ganged switches 43, 44 and 45. It should be noted, however, that separate wires in the horizontal and vertical could be used for each mode instead of dual function wires. If write in is selected, designated W in switches 43 and 45, the vertical lines of matrix 42 are connected to corresponding output terminals on a clock 47 providing a closely spaced sequence of pulses $t_1$ through $t_{16}$ on adjacent vertical lines at the bit rate of the third code. Switch 43 connects the parallel, hard-limited outputs of amplifiers 41 with respective horizontal wires of matrix 12. As clock 47 presents its pulse sequence, a sampled time history of signal polarity is recorded and held on each core row which corresponds to an input line having a signal.

If readout is selected, as shown in FIG. 1, switch 44 disconnects the vertical lines from clock 47 and couples them instead to a first and third code correlator 81 to receive the matrix output. Switch 43 disconnects the 40 line input to matrix 42. Switch 45 connects the other ends of the horizontal matrix wires to corresponding output terminals of a clock 49 providing readout pulses $T_1$ through $T_{40}$, one to each row of cores in rapid succession. If a given core is storing a negative or "zero" state signal and clock 49 supplies a positive or "one" pulse to the horizontal wire on which the given core is situated, the resulting reversal of the core's polarity will be sensed on the corresponding vertical output line and passed to correlator 81. For all of the information stored in matrix 42, an orthogonal transposition will thus occur in going from write in to readout. The serially entered information is read out in parallel, that is, simultaneously, one row or range line at a time in accordance with the series of pulses from clock 49.

Switches 43, 44 and 45 each symbolically represent a plurality of switches corresponding to the necessary number of horizontal and vertical wires. To process one "look" or one received radar pulse, manual switching as represented in FIG. 1 is possible. For continuous, automatic operation as contemplated a master clock could be used to automatically recycle the write in operation after readout is accomplished. Since conventional timing systems capable of recycling and synchronizing the operation of matrix 42 are commercially available and applicable in an obvious manner, their discussion is omitted.

Referring now to FIG. 15 the 16-vertical readout wires are connected to drive the first section of a long shift register 82 having four sections 83, 84, 85 and 86 of 16 bits each, the number of bits in the third code. Section 83 receives the parallel 16-bit output from matrix 42 via switch 44 representing one horizontal line of cores of matrix 42. Suitably selected pulses from clock 49 time the shifting of register 82 so that section 83 would have right shifted its entire contents into section 84 by the time the next adjacent horizontal line is read out of matrix 42 into section 83. Each section is tapped for output according to the known bit sequence of the third code. Output taps or terminals 87 in the first bit stage of section 83 represent outputs of opposite polarity or binary value. By connecting the output lead to the appropriate one of the two opposite output taps in each bit stage the correct binary sequence may be incorporated as an output mask. Other suitable masking or stitching systems for correlating the third code in the shift register are permissible. The output taps for the first, second and sixteenth bit stages of sections 83 and 85 are merely representative of the possible bit sequences. The plus and minus signs on the sections 83 to 86 indicate whether the output taps are regular or inverted in accordance with the bit sequence of the first code. For example, the sequence of outputs in section 84 is exactly the same as that in section 83. However, in accordance with the known ++−+ bit sequence of the first code the entire sequence of outputs in the third section 85 is inverted. Section 86 again is the same as sections 83 and 84. When the shift register 82 is completely filled with four adjacent lines, sections 83 to 86 correspond respectively to 4 adjacent or contiguous lines which were stored in corresponding rows of matrix 42. The parallel 16-line outputs from each section are continuously being passed to a summing network 88 which adds the correspondingly numbered bits in each section. That is, for four contiguous horizontal rows, the binary bits in the columns are summed to produce one compound signal having sixteen parallel bits.

Referring again to FIG. 1 the output of summation network 88 in first and third code correlator 81 is passed to a doppler stitch network 48 which provides an output to an indicator (not shown) whenever a doppler frequency is detected indicating a moving target.

Figure 2:
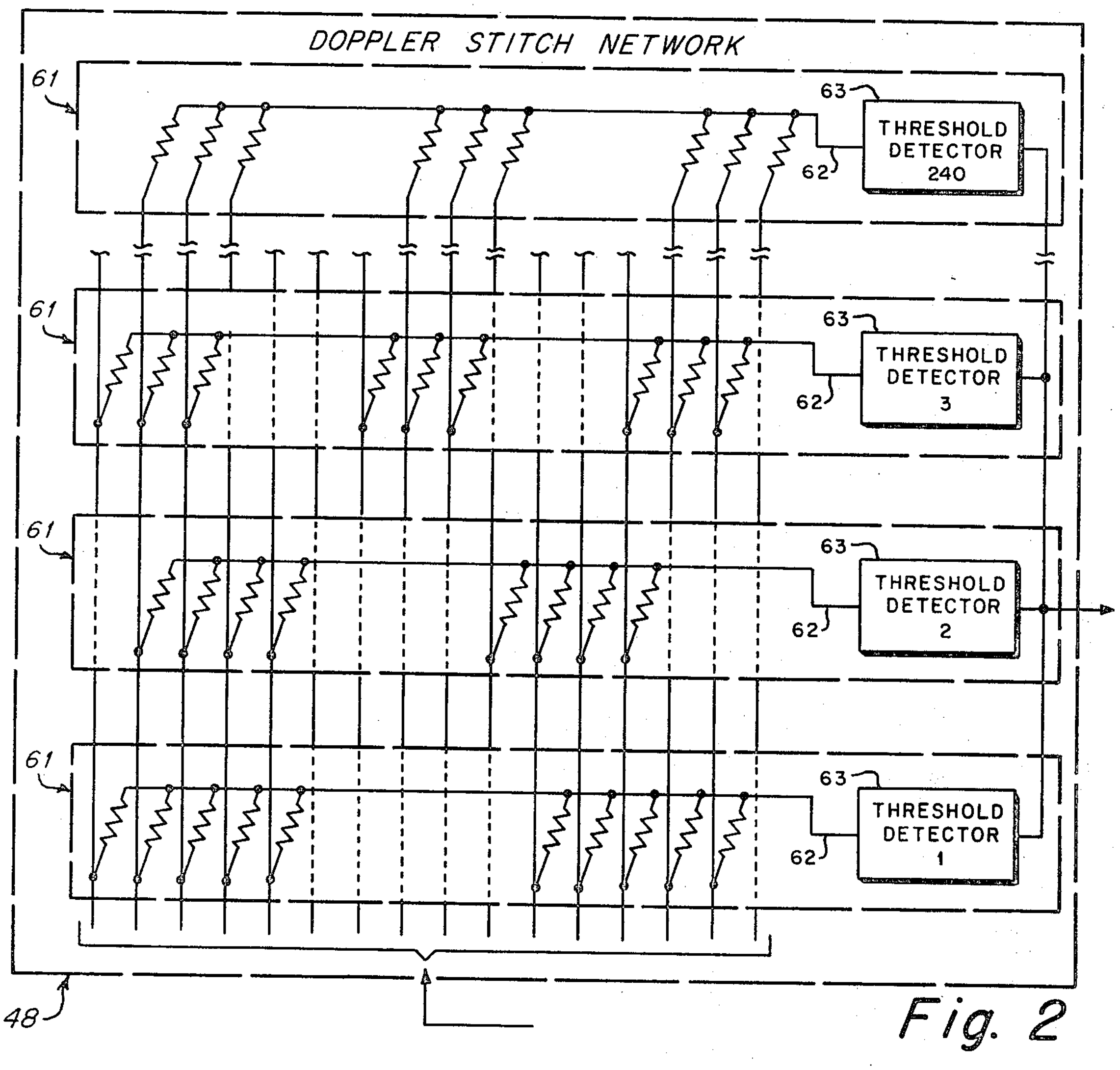
FIG. 2 is a schematic and block diagram of a preferred embodiment of the doppler stitch network of FIG. 1.
Figure 5:
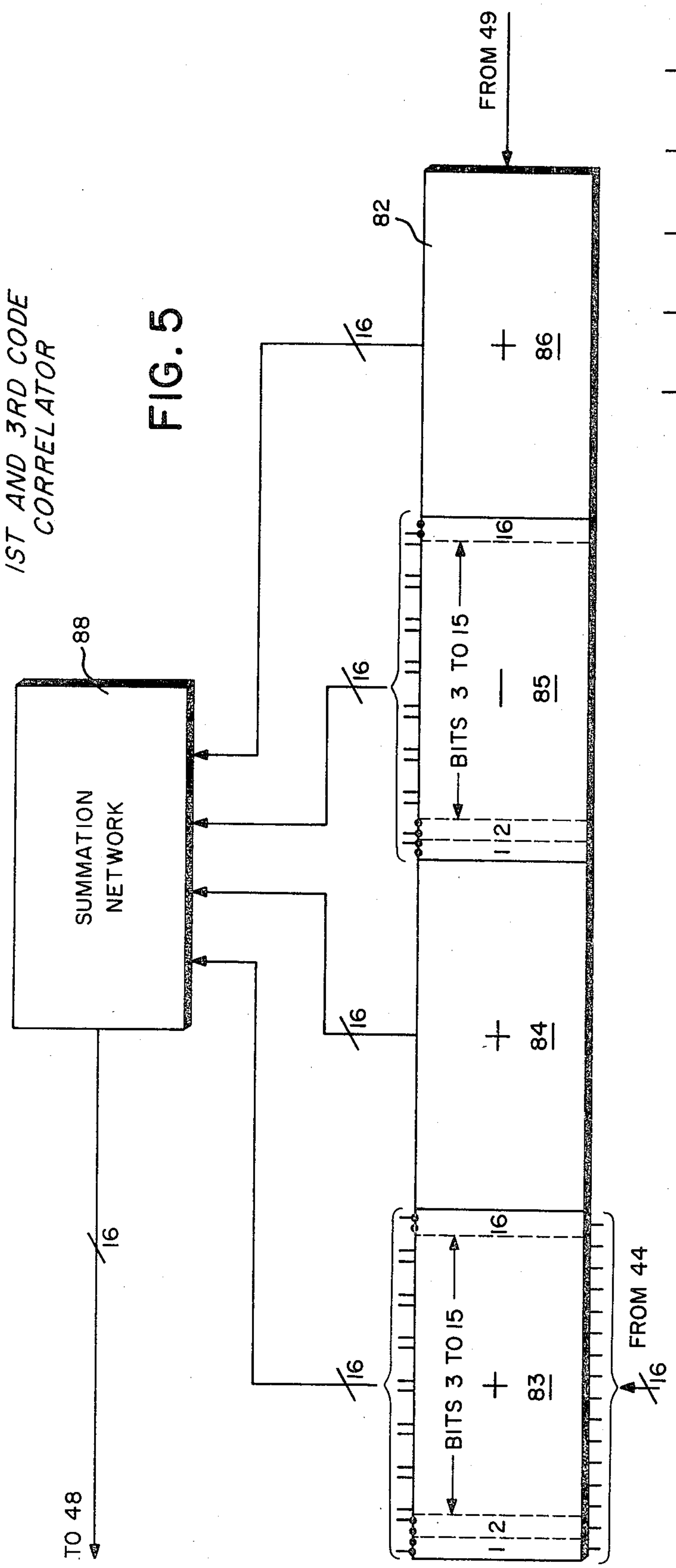
FIG. 5 is a block diagram of an embodiment of the first and third code correlator of FIG. 1.

In FIG. 2, an example of doppler stitch network 48 is shown comprising 240 summation stitchings 61, corresponding to contiguous bandwidths. Each stitching 61 has a summation line 62 connected to drive a respective threshold detector 63 labeled numbers 1 through 240. Summation lines 43 are connected through parallel, summing resistances to alternate groups of a selected number of the 16 adjacent lines coming from correlator 81 (FIG. 5). Each individual group of adjacent lines represents the required location of a single half-cycle of the signal, remaining after code correlation, which formerly was stored in matrix 42 in four adjacent core rows. Thus, summation line 62 for threshold detector 63, number 1, correlates or indicates the presence of frequencies having a period equivalent to 10 vertical lines in matrix 42, that is, 10 write in sample pulses from clock 47. The next detector 63, number 2, has a line 62 which correlates for slightly faster periods equivalent to 8 vertical lines. If the signals in each group of vertical lines are all positive, detector 63 will produce an output. Since random bipolar noise is usually present, the probability is very low that without a correct signal enough vertical lines will carry the same polarity signal causing detectors 63 to register false targets. If desired, stitchings may be varied to accept signals having the same frequency but different phase orientation. For example, detector 63, number 240, is associated with a summation line 62 which carries paralleled resistors connected to alternate groups of three adjacent vertical lines starting, not with the first line formerly in matrix 42, but with the second vertical line representing a phase shift of one sampling interval.

The breaks in the vertical lines from correlator 81 symbolize other connections to summation lines 62 for detectors 63, numbers 4 through 239 (not shown). Doppler stitch network 48 may comprise as many different summation stitchings 61 as necessary to correlate all frequencies of interest. The outputs of detectors 63 are all joined in one common stitch network output line to indicate the presence of a target. The outputs may be kept separate, however, if actual doppler frequencies are needed. As is now apparent, the term stitch refers to the pattern of alternate groupings of vertical output lines.

Figure 3:
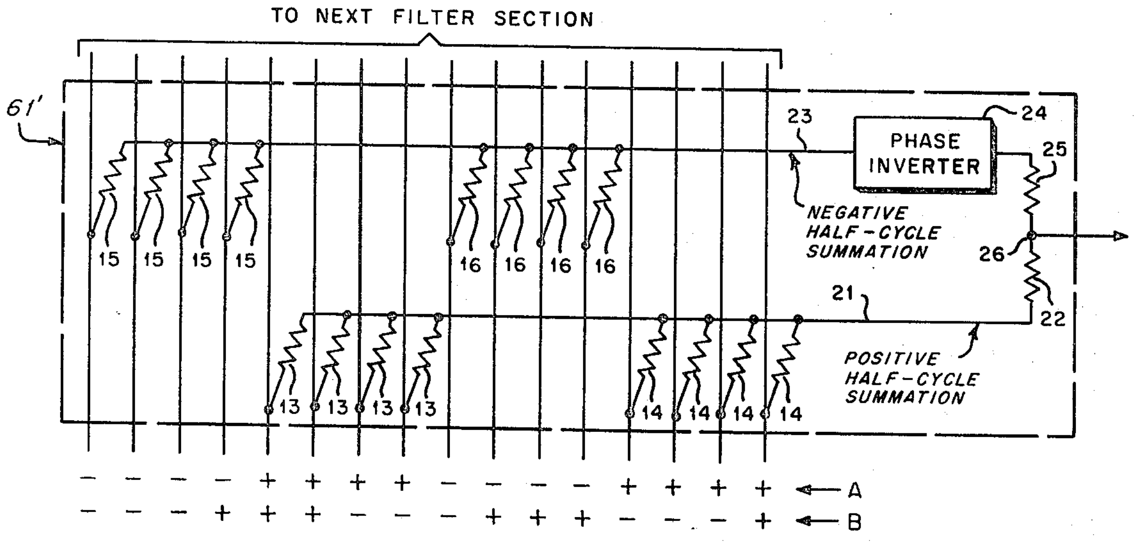
FIG. 3 is a schematic and block diagram of another embodiment of a representative doppler stitching of FIG. 2.

Referring now to FIG. 3, another embodiment 61′ of a single representative summation stitching 61 for stitch network 48 is shown. The depicted stitching 61′ and others like it, appropriately modified for different frequencies, would replace the individual summation stitching units 61 of network 48 in FIG. 2. Again, the adjacent vertical lines in FIG. 3 represent the output of correlator 81, formerly the parallel vertical output of matrix 42 (FIG. 1). The sixteen lines are divided into four groups of four lines each, the output requirement being the reversal of stored signal polarity in each adjacent group. Each line in the second group from the left is connected to one end of a respective one of four summing resistors 13, like those used for summing resistances in FIG. 2. The other ends of resistors 13 are connected in parallel to a line 21. The fourth group of four adjacent lines is connected to line 21 by means of summing resistors 14 with the result that the output on line 21 will be maximized whenever all eight signals across resistors 13 and 14 are of identical polarity. In all cases the output on line 21, which appears across a resistor 22 on line 21, will correspond to the algebraic sum of the signals across resistors 13 and 14. A second line 23 carries the sum of the signals on the remaining first and third alternate groups of output lines. Resistors 15 and 16 connect the corresponding adjacent lines in parallel to line 23. Lines 21 and 23 are designated respectively positive and negative half-cycle summation although their functions may be reversed. This terminology is meant to indicate that a full cycle of the correlating frequency will occur, for example, within the first eight vertical lines having resistors 15 and 13. The signal on line 23 is passed via a phase inverter 24 to a series resistor 25. The output of stitching 61′ is taken from junction 26 of resistors 22 and 25 connected in series and represents the algebraic sum of the signals.

Lines A and B in FIG. 3 illustrate two exemplary 16-bit input signals to network 48. Line A carries a signal whose polarity alternates with a frequency equivalent to the time required for clock 47 to pulse four write in vertical lines in FIG 1, that is, each group of four adjacent cores in the horizontal line receiving signal A had the same polarity, but for the coded information then remaining, the first three being negative, and the second three being positive, and so on. Thus, the signals on resistors 13 and 14 connected to positive half-cycle summation line 21 will all be positive so that the sum across resistor 22 will be equivalent to eight positive units. Likewise, the signals appearing across resistors 15 and 16 will all be negative. It should be understood that the pulses and minuses in lines A and B are merely indicative of analog signals which happen, in this case, to have the same absolute magnitude. In practice this would not always be true so that the resistances might have to be appropriately weighted. The bit rate of the first code is ordinarily so fast, however, that variations in the doppler frequency modulated thereon over one cycle of first code are slight. For line A the sum in line 23, inverted by phase inverter 24, will be eight additional positive units across resistor 25. The output at junction 26 will therefore be 16 positive units indicating a stored signal of the desired or correlated frequency. It can be shown that any stored signal on a horizontal line which does not assume the same pattern as signal A will produce an output of approximately zero. For example, line B represents a signal of a slightly shorter period corresponding to only six of the write in pulse intervals. While the first three signals appearing across resistors 15 will all be appropriately negative, the signal on the fourth resistor 15 of line 23 will be positive instead of negative. Other discrepancies will appear in the summation. These errors will cause cancellation of the inverted negative half-cycle summation and the positive half-cycle summation to produce an output of nearly zero indicating an uncorrelated frequency. In the case shown, limited to only 16 vertical lines corresponding to 16 third code bits for illustration, the output at junction 26 for the signal in line B would be equivalent to −2 units. However, if the number of vertical lines in matrix 42 were increased, for example, to 300, the ratio of uncorrelating output units to correlating output units would become very small. Thus stitching 61′ performs detection of correlated frequencies without threshold detectors.

In order to provide enough storage capacity and sensitivity to furnish information over the doppler frequency range of interest, the number of vertical lines and the interval between write in pulses from clock 47 (FIG. 1) should be several times shorter than the fastest period anticipated for the input signals on the horizontal lines. If the sampling or writing rate exceeds the bit rate of the third code, the third code output mask on register 82 must be suitably modified. These should be at least a sufficient number of vertical sampling impulses to obtain a representative record of at least one cycle of even the most slowly varying doppler signal. The requirements depend, of course, on the bandwidth the digital filter is designed to handle.

In order to more fully understand the operation of the two dimensional code correlator system it should be mentioned that the signals received by receiver 34 (FIG. 1) comprise two fundamental types of information, that is, range and velocity or range rate. The latter concerns a doppler shift frequency which induces a phase modulation on the transmitted signal. Phase detector 36, storage matrix 42, and doppler stitched network 48 and their associated components deal primarily with the doppler portion of the received signals. The remainder of the components following receiver 34 in FIG. 1 deal with code correlation to determine the range of a target. A corollary aspect of code correlation is in discriminating against clutter or noise which does not carry the coded phase sequence and, therefore, can be excluded in effect by the correlators. Thus, in order to emphasize the inventive two-dimensional correlator, that portion of FIG. 1 which deals with range rather than doppler information will now be discussed in more detail. However, it will be understood that the compatibility between the two-dimensional correlator system and the doppler stitch network 48 used in digital frequency analysis is an important feature of the invention.

Figure 6:
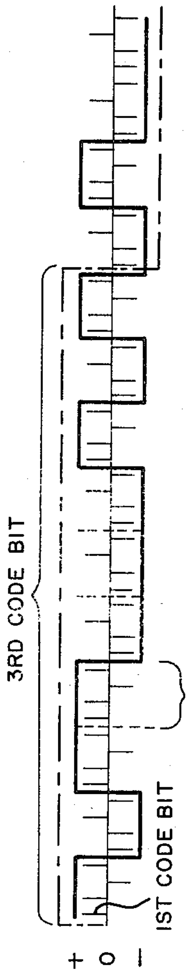
FIG. 6 is a diagram illustrating a typical three-code format.
Figure 7:
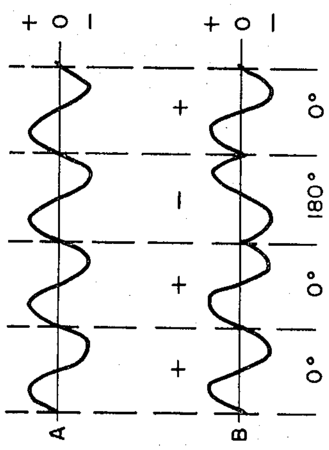
FIG. 7 is a diagram illustrating the effects of phase encoding on a typical signal.

The transmitted signal consists of a long phase encoded pulse of RF energy. Those skilled in the radar art will appreciate that the system shown in FIG. 1 is more similar to the theoretical CW correlation radar rather than the pulse ranging type. However, because of interference between the transmitter and receiver the transmitter is shut off well before the receiver is turned on so that transmit and receive cycles do not overlap. The transmitted code is in essence a long fast code charged to three separate codes. Those skilled in the art will recognize that multiple compound codes are used herein to overcome the present speed limitations of shift registers which would be encountered if a single fast code were used. An example of the format of the three superimposed codes is shown in FIG. 6. Each 4-bit word of the first code is modified in accordance with the sequence of polarities of the second code. Likewise each 10-bit word of the second code is normal or inverted in accordance with the bit sequence of the third code. The number of bits in the third code should be sufficient to cover the entire transmission period so that only the first and second codes repeat and pose range ambiguities. The signal shown in FIG. 6 corresponds to the signal proceeding from code generator 28 to inverter switch 29. At switch 29 the phase orientation of the CW RF signal is changed back and forth between 0° and 180° in accordance with the polarity and bit rate of the first code. To illustrate the form of the resulting signal, the unmodified waveform from oscillator 30 is shown in FIG. 7, line A, and the resulting phase reversals after switch 29 are shown in line B for the first code bit sequence.

It will be assumed for illustration that the incoming signal at receiver 34 is a replica of the transmitted encoded signal. The received signal is homodyned in detector 36 with an unencoded sample of the signal from oscillator 30. Even without a doppler shift there would be an output from detector 36 since the received signal is phase encoded with respect to the output of oscillator 30. If a moving target has induced a sinusoidal variation in phase which is superimposed on the encoded phase shifts, the detector output must first be correlated before doppler processing can be completed. After correlation a moving target will have a signal comprising a series of pulses whose amplitude is modulated by the difference or doppler frequency. For a static target the series of pulses will be unmodulated if correlated.

Continuing with the operation of the system of FIG. 1, the bits of the first code are sorted onto four parallel gated lines by distribution unit 27. The first bits of each word of the first code will appear on the output of one line while the second and remaining bits will be distributed on corresponding adjacent lines. It must be understood that the second and third code sequence of polarities remains undisturbed by this operation since they are still distributed horizontally instead of vertically like the first code. Distribution unit 27, however, does not actually correlate for the first code, therefore all of the coded information relating to range is still present after distribution unit 27. When the signal has passed through the second code correlator 71, all of the second code information has been removed. Since the second code bit rate is intermediate, this operation is analogous to determining the 10's digit in an otherwise unknown 3-digit decimal number. After correlator 71 the information left on the signal is indicative of first code, third code and doppler frequency. At this point the analog signal output of correlator 71 is hard limited and converted thereby to a binary signal which is sampled and stored in matrix 42. Those familiar with signal processing will understand that all three types of information, first and third code and doppler frequency, are preserved by the storage operation. For a target signal each horizontal row of matrix 42 will have binary cores encoded as to polarity in accordance with the third code only. Each column of matrix 42 will carry the first code sequence. Since there are forty rows including ten groups of four lines produced by distribution unit 27, each group of four contiguous horizontal lines will be encoded vertically with one word of the first code. Therefore, to completely remove the code information by correlation, vertical and horizontal correlation must be accomplished. While such correlation in the past has required two separate steps, the inventive correlator 81 provides simultaneous correlation in both dimensions. One row of stored signals is read into section 83 of register 82 (FIG. 5) at a time. When the information in section 83 has been clocked into section 84 the next line of signals from matrix 42 is read into section 83. Whenever the signal correlates with the third code mask it is read out correlated into summation network 88. However, until both the first and the third codes have correlated, the output of summing network 88 will not be limited to doppler information. Instead it will be confused or scrambled with information relating to one stored code or the other. Both codes must be removed before the doppler frequency information can be processed. Therefore, four contiguous horizontal lines must be read into register 82 and fill all of the shift register sections to have complete correlation. The sequence of polarities as between adjacent sections represents the required relationship between horizontal rows and matrix 42. When the compound criteria have been satisfied by the signal read into register 82 the outputs are passed to network 88 which adds up the corresponding bits among each line. That is, the first bits of each line, or in each section of the register, are summed and then the second bits, etc., to provide a single 16-bit analog output to stitch network 48. Since the received signal has now been correlated for the first, second and third codes, the only information remaining on the lines, in the absence of clutter and noise, is the doppler shift frequency which has not been affected by the prior operations. By observing at any given time the variation in analog amplitudes and polarities across all 16 lines, it is possible to tell whether a definite frequency was present when the original signals were received. Doppler stitch network 48 accomplishes this by monitoring various patterns of high and low lines or positive and negative amplitudes on the lines.

In an operating piece of equipment the numbers of bits in the individual codes would be much greater. A typical number of bits for the first, second and third codes would be respectively 11, 127 and 288. The resulting number of rows in matrix 42 would be 1407. Much simpler code format has been discussed herein since it facilitates an understanding of the invention. The third code output taps in each section of shift register 82 (FIG. 5) are also merely illustrative. The number of stages, which may be flip-flops, in each section, does not have to be the same number as the number of bits of the third code being processed. For example, in between stages 1 and 2 of section 83 there may be several additional stages if desired.

The unique advantage attained by two dimensional correlation in the system of FIG. 1 relates to the noise discrimination ability of the processing system. The easiest way to understand the contribution of two dimensional correlation is to compare the system of FIG. 1 with a similar hypotehtical system which completely correlates for the first two codes before going into storage. That is, after storage in the matrix, the signals are processed for only the third code and doppler information. For such a system the obvious way to increase the maximum clutter that can be handled is to lower both the signal and correlated clutter levels with respect to noise, at the hard limiter inputs to the matrix. This can be done if there is more processing gain in storage, which implies more cores. Instead of physically increasing the number of cores and the sampling rate, the invention provides a means of effectively increasing the processing gain with the same number of cores. In the hypothetical system the first code is completely processed resulting in four lines which, after second code correlation, becomes forty lines just as in the system of FIG. 1. The difference lies not in the number of horizontal lines but in the fact that in FIG. 1 the first code correlation remains to be done after storage. Instead of initially correlating the first 4-bit code, the invention separates the coded signal into four channels by using contiguous range gates. The effect of range gating in this manner is to distribute the bits of the first code on four contiguous horizontal lines. Now, with the same sampling rate as before, all signals will be distributed over 40 × 16 = 640 cores, still using the same size of core storage as in the hypothetical case. However, now the processing gain after storage has been increased and the signal to noise ratio and clutter to noise ratio have been decreased. The dynamic range against correlated clutter has been increased by four times. The increase in this dynamic range will be exactly equal to the number of bits in the first code which have been distributed over the separate horizontal lines.

Those skilled in the art will recognize that other suitable arrangements may be made for distributing the first code over contiguous horizontal lines and that the second code may be correlated by any conventional code correlator. It should also be noted that core matrix 42 may be replaced with an equivalent set of flip-flops operated by conventional sampling gates.

An essential feature of the two dimensional simultaneous correlation technique is that all code or range correlation is done on a binary bit basis although each output of the summing network is an analog signal. The two dimensional correlator system is the most efficient method yet discovered for correlating signals in two-dimensional storage where high dynamic range of correlation after storage is necessary.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A two dimensional correlation system for identifying a target signal, comprising:

gating means adapted to receive a signal encoded with at least two superimposed binary codes with different bit rates for distributing the bits of a first of said codes onto corresponding parallel output lines;

storage means including an array of storage elements arranged in a plurality of rows with corresponding input terminals operatively connected to receive said gating means output lines for storing at a predetermined rate the polarity of the signal on each of said input terminals at regular time intervals in corresponding ones of said rows and for sequentially reading out in parallel the stored signal in each said row, one row at a time, to a plurality of readout terminals; and first correlator means operatively connected to the readout terminals for simultaneously comparing the stored signal from a single row with a stored replica of a second of said codes and the polarity of the stored signal from one row relative to the polarity of the stored signal from an adjacent row with a stored replica of said first code to produce an output indicative of correlation with said first and said second codes.

2. A correlation system according to claim 1 further comprising:

said first correlator means including shift register means having an input section connected to said storage means readout terminals to receive the stored signal thereon, at least one positive section with individual stages tapped for output in accordance with the sequence of said second code and at least one negative section with individual stages tapped for output in accordance with the inverted sequence of said second code, the order of said positive and negative sections being in accordance with said first code, and summation network means connected to receive the respective outputs of said positive and negative sections for summing corresponding signals therein to produce said first correlator means output.

3. A correlation system according to claim 2 further comprising:

said first correlator means including means for synchronizing shifting of said shift register means with the reading out of said storage means.

4. A correlation system according to claim 3 further comprising:

said storage means including means for determining the rate of storage at a rate approximately equal to the bit rate of said second code.

5. A correlation system according to claim 4 wherein:

said first code is a repeating code with a faster bit rate than said second other code.

6. A correlation system according to claim 2 further comprising:

second correlator means operatively connected to receive said gating means output lines for comparing the signal thereon with a stored replica of a third of said codes to produce parallel output lines indicative of correlation with said third code operatively connected to said storage means input terminals.

7. A correlation system according to claim 6 further comprising:

said first correlator means including a plurality of output terminals corresponding to said storage means regular time intervals, said first correlator means output being produced at said output terminals; and frequency analyzing means including a plurality of summing means corresponding to predetermined frequency bands, each said summing means having a plurality of input terminals operatively connected to selected ones of said first correlator means output terminals for producing an output indicative of the presence of a desired frequency.

8. A correlation system according to claim 7 further comprising:

said selected ones of said first correlator means output terminals comprising alternate groups thereof corresponding to like polarity portions of said first correlator means output.

9. A correlation system according to claim 6 further comprising:

said array of storage elements being a two-dimensional orthogonal array of magnetic cores arranged in columns and rows; and said storage means including a first set of conductors operatively connecting together the cores in each said column, a second set of conductors operatively connecting together the cores in each said row, sampling means for providing sample pulses at a plurality of output terminals, readout pulse means for providing sequential pulses at a plurality of output terminals, first switch means for selectively connecting said second set of conductors to receive said second correlator means output lines, second switch means for selectively connecting said first set of conductors with said sampling means output terminals, third switch means for selectively connecting said first set of conductors with said storage means readout terminals, and fourth switch means for selectively connecting said readout pulse means output terminals with said second set of conductors.

10. A signal correlation system according to claim 9 further comprising:

amplitude limiting means operatively connected to said storage means first switch means and connected to corresponding ones of said second correlator means output lines for passing a binary signal to respective ones of said second set of conductors when said second switch means is actuated.

11. A signal correlation system according to claim 9 wherein:

said sampling means are spaced at said regular time intervals in accordance with the bit rate of said third code.

12. A correlation doppler ranging system, comprising:

transmitter means for producing a transmitted signal which is phase encoded with first, second, and third superimposed binary codes, one full cycle of the first code bit sequence forming a single bit of the second code, and one full cycle of the second code bit sequence similarly forming a single bit of the third code;

receiver means for receiving a reflected portion of said transmitted signal;

detector means operatively connected to said transmitter means and said receiver means for producing an output indicative of the first, second and third codes in said reflected portion of said transmitted signal and including frequencies indicative of doppler shifts;

gating means connected to receive said detector means output for distributing the bits of the first code onto corresponding parallel output lines;

second code correlating means connected to receive said gating means output lines for digitally comparing the signals thereon with a stored replica of said second code for producing parallel output lines indicative of correlation with said second code;

storage means including an array of storage elements in rows and columns for storing the polarity of the signal on each said second code correlating means output line at regular time intervals in accordance with the bit rate of the third code in corresponding ones of said rows and for sequentially reading out in parallel the stored signal in each said row, one row at a time, to a plurality of readout terminals;

shift register means having an input section connected to said storage means readout terminals to receive signals thereon, at least one positive section with individual stages tapped for output in accordance with the sequence of said third code and at least one negative section with individual stages tapped for output in accordance with the inverted sequence of said third code, the order of said positive and negative sections being in accordance with the first code;

summation network means connected to receive the respective outputs of said positive and negative sections for summing corresponding signals therein to produce an output indicative of correlation with said first and third codes at a plurality of output terminals; and frequency analyzing means including a plurality of summing means corresponding to predetermined frequency bands, each said summing means having a plurality of input terminals operatively connected to selected ones of said summation network means output terminals for producing an output indicative of the presence of a frequency to identify a moving reflective target.

13. A two-dimensional correlator, comprising:

a two-dimensional array of storage elements each having an output terminal; and correlator means operatively connected to said terminals for simultaneously comparing said array outputs in one dimension with a stored replica of a first fixed sequence and said outputs in the other dimension with a stored replica of a second fixed sequence to produce an output indicative of correlation with said first and second sequences.

14. A correlator according to claim 13 further comprising:

said array including rows and columns of said storage elements in said first and second dimensions respectively; and said correlator means comparing said array outputs from a single row with said replica of said first sequence and said array outputs from one row relative to said array outputs from an adjacent row with said replica of said second sequence.

15. A correlator according to claim 14 further comprising:

said correlator means including shift register means having an input section operatively connected to said terminals to receive said array outputs, at least one positive section with individual stages tapped for output in accordance with said first sequence and at least one negative section with individual stages tapped for output in accordance with an inverted version of said first sequence, the order of said positive and negative sections being in accordance with said second sequence, and summation network means connected to receive the respective outputs of said positive and negative sections for summing corresponding signals therein to produce said correlator means output.

16. A digital correlator for identifying a target signal, comprising:

shift register means having a plurality of sections including a first section having parallel input terminals adapted to receive a plurality of input signals, at least one positive section with individual stages tapped for output in accordance with the sequence of a first binary code and at least one negative section with individual stages tapped for output in accordance with the inverted sequence of said first code, the sequence of said at least one positive and negative sections being predetermined in accordance with a second binary code; and summation network means connected to receive the respective outputs of said positive and negative sections for summing corresponding signals therein to produce an output indicative of correlation of said input signals with said first and second codes.

17. A method of performing multiple correlation on an input signal carrying three superimposed binary codes with different bit rates, comprising the steps of:

distributing the bits of the first code in the input signal over corresponding first outputs;

correlating the second code in said first outputs to produce second outputs;

storing samples of said second outputs at the rate of the third code on corresponding rows of an orthogonal storage matrix; and correlating simultaneously the first and third codes distributed vertically and horizontally respectively in said storage matrix to produce a first, second and third code correlated output.

18. The method according to claim 17 further comprising the step of:

analyzing the frequency content of said correlated output.

* * * * *